United States Patent [19]

Rothermel

[11] Patent Number: 4,631,385
[45] Date of Patent: Dec. 23, 1986

[54] AUTOMATED POSITION DETECTORS AND WELDING SYSTEM UTILIZING SAME

[75] Inventor: Ronald R. Rothermel, Pollock Pines, Calif.

[73] Assignee: Dimetrics, Inc., Diamond Springs, Calif.

[21] Appl. No.: 717,357

[22] Filed: Mar. 29, 1985

[51] Int. Cl.$^4$ .............................................. B23K 9/12
[52] U.S. Cl. ........................... 219/124.03; 219/125.12; 219/137.71
[58] Field of Search .................... 219/124.03, 124.02, 219/124.22, 125.12, 137 PS, 137.71

[56] References Cited

U.S. PATENT DOCUMENTS

| | | | |
|---|---|---|---|
| 3,484,667 | 12/1969 | Wofsey | 318/18 |
| 3,538,299 | 11/1970 | Daggett | 219/124.03 |
| 4,092,517 | 5/1978 | Woodacre | 219/137 PS |
| 4,103,141 | 7/1978 | Wristen | 219/130.01 |
| 4,169,224 | 9/1979 | Puschner | 219/124.22 |
| 4,301,355 | 11/1981 | Kimbrough et al. | 219/137 PS |
| 4,316,075 | 2/1982 | Isoya et al. | 219/125.12 |
| 4,348,578 | 9/1982 | Masaki | 219/130.01 |
| 4,409,465 | 10/1983 | Yamamoto et al. | 219/137 PS |
| 4,417,126 | 11/1983 | Kasahara et al. | 219/125.12 |
| 4,438,317 | 3/1984 | Ueguri et al. | 219/130.51 |
| 4,441,011 | 4/1984 | Nomura et al. | 219/124.03 |

FOREIGN PATENT DOCUMENTS

| | | | |
|---|---|---|---|
| 2842496 | 4/1980 | Fed. Rep. of Germany | 219/124.03 |
| 742064 | 6/1980 | U.S.S.R. | 219/124.03 |

OTHER PUBLICATIONS

"Microcomputer Control of an Adaptive Positioning System for Robotic Arc Welding," IECI Proceedings, 1981.

Motiwalla, "Seam Tracking Robots Meet Variations in Autobody Fitup," Weld. Des. & Fab., May 1985, p. 79.

*Primary Examiner*—Clifford C. Shaw
*Attorney, Agent, or Firm*—Pennie & Edmonds

[57] ABSTRACT

A system and method for detecting the position of the welding torch with respect to the workpiece by varying the electrical power to the arc, measuring the effect of such variation on the arc current and/or arc voltage and processing the detected effect to produce welding torch position related information. Also, a welding system and method which comprises utilizing this detection system and method to control the position of the welding torch means with respect to the workpiece.

39 Claims, 3 Drawing Figures

GENERALIZED TORCH PROXIMITY/WELDMENT GEOMETRY
DETECTOR AND TORCH PROXIMITY CONTROLLER

GENERALIZED TORCH PROXIMITY/WELDMENT GEOMETRY DETECTOR AND TORCH PROXIMITY CONTROLLER

AUTOMATIC TORCH PROXIMITY CONTROL
SPECIFIC IMPLEMENTATION

CURRENT AND VOLTAGE WAVEFORMS FOR SYSTEM OF FIG. 2

AUTOMATED POSITION DETECTORS AND WELDING SYSTEM UTILIZING SAME

TECHNICAL FIELD

The application relates to a method and apparatus for controlling the position of the welding torch during consumable electrode arc welding. More particularly, the invention relates to the through-the-arc detection of the welding torch proximity and/or weldment geometry along with automatic position controller means which utilize these detection techniques.

BACKGROUND ART

Present methods for consumable electrode arc welding processes usually involve various means for regulating arc voltage indirectly control arc length. While the use of an automatic feedback control to vary the welding arc voltage also may control the arc length to same degree, there is no known practical method for sensing the arc voltage between the point at which the electrode material becomes molten or the point from which the arc emanates and the base metal or part to be welded. The closest practical measurement of arc voltage is usually made between the contact tip and the work piece. Controlling this measured voltage provides limited control over the actual arc voltage and an indirect control of the arc length, provided that the distance between the contact tip and the base metal does not vary over too wide a range.

Assuming the contact potential (i.e.—the potential across the point of current transfer between the electrode and the contact tip) to be negligible, the voltage being regulated between the contact tip and the base metal is equal to the voltage drop across the electrode stick-out (i.e.—current (I) times electrode stick-out resistance (Re)) plus the voltage drop across the actual arc. Both of these voltage drops are functions of length: increased arc length and/or stick-out yield higher voltage. Stick-out is defined as the length of electrode material or the distance from the end of the contact tip to the point on the electrode material from which the arc emanates. The distance from the end of the contact tip to the base metal equals the stick-out length plus the actual arc length. Therefore, any variation in the distance between the end of the contact tip and the base metal causes a variation in the stick-out and the actual arc length, which variation corresponding causes variations in the actual arc voltage.

In actual practice, other undesirable effects may occur due to the variation of the distance between the contact tip and base metal. If the torch to base metal distance increases, a long electrode stick-out will result in greater electrode preheating because more power is imparted to the electrode due to greater IRe voltage drop. This, in turn, causes the arc current to decrease. Also, the extent and variation of electrode cast affects the exact positioning of the arc. Therefore, there is a need to maintain a constant electrode stick-out length or a constant contact tip to base metal proximity.

There are a number of present methods for controlling the height or proximity of the welding torch with respect to the base metal. Existing systems are based on contacting mechanical followers, contacting electromechanical sensors, non-contacting eddy current transducers, non-contacting optical sensors, as well as through-the-arc current sensing techniques. All of the present techniques suffer various disadvantages.

The key to accurately controlling torch to workpiece proximity lies in the ability to obtain distance related information in the immediate vicinity of the arc. Applicant has now discovered a new through-the-arc sensing or detecting technique that provides the needed information while resolving the deficiencies of the prior art.

SUMMARY OF THE INVENTION

The invention relates to welding torch means position detecting system comprising means for directing consumable electrode metal through contact means in a welding torch means to a workpiece, means for providing electrical power to establish an arc between the consumable electrode metal and workpiece, means for varying the electrical power supplied to the arc, and means for detecting the effect of the electrical power variation on at least one of arc voltage or arc current.

The means for varying the electrical power comprises means for varying at least one of current or voltage, and the means for detecting the effect of the electrical power variation is at least one of arc voltage sensing means or arc current sensing means.

According to one embodiment of the invention, the arc voltage sensing means or arc current sensing means comprises means to process the sensed voltage or current signals to produce welding torch means position related information. Also, the arc voltge sensing means or arc current sensing means may include electronic filter means to selectively sense the desired information.

The detection system may also include separate means for processing the detected effect on the arc voltage and/or arc current so as to produce welding torch means position related information. Again, the means for detecting the effect of electrical power variation comprises voltage sensing means and current sensing means.

The means for processing the detected effect on arc voltage and arc current is preferably impedance computing means, and the system may include separate electronic filter means to selectively sense the desired information.

The invention also relates to a welding torch means position detection system comprising means for directing consumable electrode metal through contact means in a welding torch means to a workpiece, means for providing electrical power to establish an arc between the consumable electrode metal and the workpiece, the electrical power providing means including means for producing a predetermined current variation, means for detecting the effect of the predetermined current variation on the arc voltage, and means for processing the detected effect on the arc voltage so as to produce welding torch means position related information. In this system, the means for providing electrical power comprises pulsed power source means. The detecting means may also include means for detecting the effect of the predetermined current variation on the arc current.

Alternately, a welding torch means position detection system is disclosed which includes means for directing consumable electrode metal through contact means in a welding torch means to a workpiece, means for providing electrical power to establish an arc between the consumable electrode metal and the workpiece, the electrical power providing means including means for producing a predetermined voltage variation, means for detecting the effect of the predetermined voltage variation on the arc current, and means for processing the detected effect on the arc current so as to produce welding torch means position related information. In this system, the detecting means further comprises means for detecting the effect of the predetermined voltage variation on the arc voltage.

Another embodiment of the invention relates to a welding system comprising means for directing consumable electrode metal through contact means in a welding torch means to a workpiece, means for providing electrical power to establish and arc between the consumable electrode metal and workpiece, means for varying the electrical power supplied to the arc, means for detecting the effect of the electrical power variation on at least one of arc voltage or arc current, means for processing the detected effect on the arc voltage and/or arc current so as to produce welding torch means position related information, and means for controlling the relative position of the welding torch means and workpiece.

The means for controlling the relative position of the welding torch means and workpiece comprises means for adjusting the position of at least one of the welding torch means or workpiece, means for commanding a desired positional relationship of the torch means and workpiece, means for comparing the detected position related information with the desired positional relationship, and means operatively associated with the comparison means for controlling the position adjusting means to correspond the detected position with the desired positional relationship. The adjusting means may include means for automatically varying the vertical and/or horizontal position of the welding torch means with respect to the workpiece.

It is also possible for this system to include means for perturbing at least one of the welding torch means or workpiece such that the welding torch means weaves across a prepared weld joint on the workpiece in order to enhance detection and control of the horizontal and/or vertical position of the welding torch means with respect to the workpiece.

Other welding systems according to the invention incorporate at least one of the detection systems described previously along with means for adjusting the position of at least one of the torch means or workpiece, means for commanding a desired position relationship of the torch means and workpiece, means for comparing the detected position related information with the desired positional relationship, and means operatively associated with the comparison means for controlling the position adjusting means to correspond the detected position with the desired positional relationship.

Another aspect of the invention relates to a method for detecting the position of welding torch means which comprises directing consumable electrode metal through contact means in a welding torch means to a workpiece, providing electrical power to establish an arc between the consumable electrode metal and the workpiece, varying the electrical power supplied to the arc, and detecting the effect of the electrical power variation on at least one of arc voltage or arc current.

The step of varying the electrical power comprises varying at least one of current or voltage, and the detecting step comprises sensing the arc voltage and/or arc current and processing the sensed signals to produce welding torch means position related information. The method also contemplates processing the detected effect on the arc voltage and/or arc current so as to produce welding torch means position related information.

Another method for detecting the position of welding torch means comprises directing consumable electrode metal through contact means in a welding torch means to a workpiece, providing electrical power to establish an arc between the consumable electrode metal and the workpiece, the electrical power providing means including means for producing a predetermined current variation, detecting the effect of the predetermined current variation on the arc voltage, and processing the detected effect on the arc voltage so as to produce welding torch means position related information. The detecting step may also include detecting the effect of the predetermined current variation on the arc current.

Alternately, a method for detecting the position of welding torch means comprises directing consumable electrode metal through contact means in a welding torch means to a workpiece, providing electrical power to establish an arc between the consumable electrode metal and the workpiece, the electrical power providing means including means for producing a predetermined voltage variation, detecting the effect of the predetermined voltage variation on the arc current, and processing the detected effect on the arc current so as to produce welding torch means position related information. In this method, the detecting step may include detecting the effect of the predetermined voltage variation on the arc voltage.

This invention also relates to welding method comprising directing consumable electrode metal through contact means in a welding torch means to a workpiece, providing electrical power to establish an arc between the consumable electrode metal and workpiece, varying the electrical power supplied to the arc, detecting the effect of the electrical power variation on at least one of arc voltage or arc current, processing the detected effect on the arc voltage and/or arc current so as to produce welding torch means position related information, and controlling the relative position of the welding torch means and workpiece.

The step of controlling the relative position of the welding torch means and workpiece preferably comprises adjusting the position of at least one of the torch means or workpiece, commanding a desired positional relationship of the torch means and workpiece, comparing the detected position related information with the desired positional relationship, and controlling the adjusted position to correspond the detected position with the desired positional relationship. The position adjusting step may include automatically varying the vertical or horizontal position of the torch means with respect to the workpiece and perturbing at least one of the welding torch means or workpiece so that the welding torch means weaves across a prepared weld joint on the workpiece in order to enhance detection and control of the horizontal and/or vertical position of the welding torch means with respect to the workpiece.

Other welding methods include detecting the position of the welding torch means as described above, adjusting the position of at least one of the torch means or workpiece, commanding a desired position relationship of the torch means and workpiece, comparing the detected position related information with the desired positional relationship, and controlling the position adjusting means to correspond the detected position with the desired positional relationship.

BRIEF DESCRIPTION OF THE DRAWINGS

A better understanding of the foregoing methods together with suitable apparatus for carrying out these methods can be had by now referring to the accompanying drawing figures, in which.

DETAILED DESCRIPTION OF THE INVENTION

The methods of the invention for through-the-arc detection of welding torch position (i.e., proximity to base metal and/or weldment geometry) are particularly useful in consumable electrode arc welding processes. The term "through-the-arc" is defined here as pertaining to the information derived from the welding arc itself. Briefly, these techniques include directly measuring the distance related electrical impedance between the contact tip and the workpiece, detecting and processing distance related components of the contact tip to work piece voltage, or detecting and processing distance related components of arc current.

Figure 1:
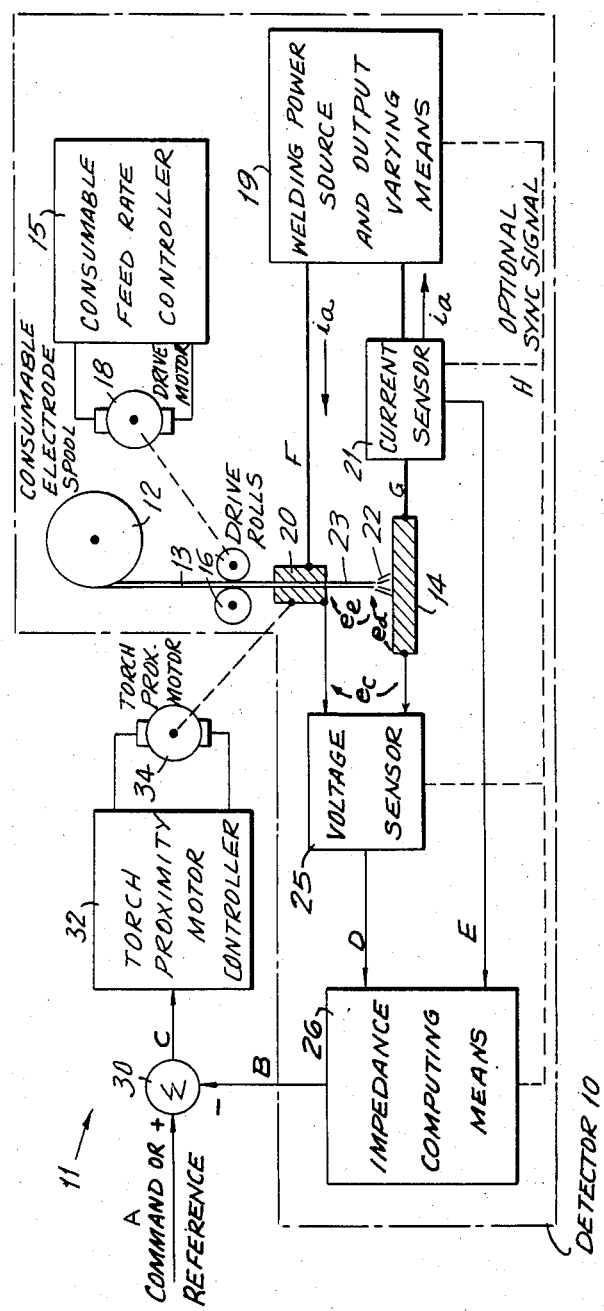
FIG. 1 is a block diagram of a generalized torch proximity/weldment geometry detector and torch proximity controller.

Referring initially to FIG. 1, there is illustrated a block diagram of a generalized torch proximity and weldment geometry detector 10 and position controller system 11 according to the invention. The detector 10 requires apparatus for feeding a consumable electrode material 13 through a welding torch which has a contact tip or element 20 and then to a base metal, weldment, workpiece or part to be welded 14, where a welding arc 22 is established. The contact element 20 provides the means for transferring electrical power from a welding power source 19 to the electrode material and ultimately to the welding arc 22. Leads F and G connect the welding power source 19 to the contact tip 20 and weldment 14, respectively.

The apparatus for feeding the consumable electrode material comprises a feed rate controller 15, a feed drive motor 18, "pinch" drive rolls 16, and a spool of consumable electrode material 12. The feed rate controller is used to control or regulate the rate at which the consumable electrode is fed into the arc. All of the elements described up to this point are common to any apparatus for arc welding with consumable electrode material.

The additional elements which may be required specifically for detector 10 are means for varying the electrical power supplied to the arc (shown here as part of element 19), an arc current sensor 21, a contact tip to workpiece voltage sensor 25, and impedance computing means 26.

It should be noted that the means for varying the electrical power supplied to the arc need not reside within the power source. Externally connected electrical means could be used. For example, an a.c. signal could be transformer coupled in series with or across the power source output. Also, the means for varying the electrical power could be generated in more subtle ways, such as perturbing the feed rate of the consumable material or even perturbing the contact tip to work piece distance. The power variation may also take on many forms. For purpose of illustrating a detection method in the following detailed description, it will be assumed that a small sine wave of current has been superimposed on the average welding current.

Figure 2:
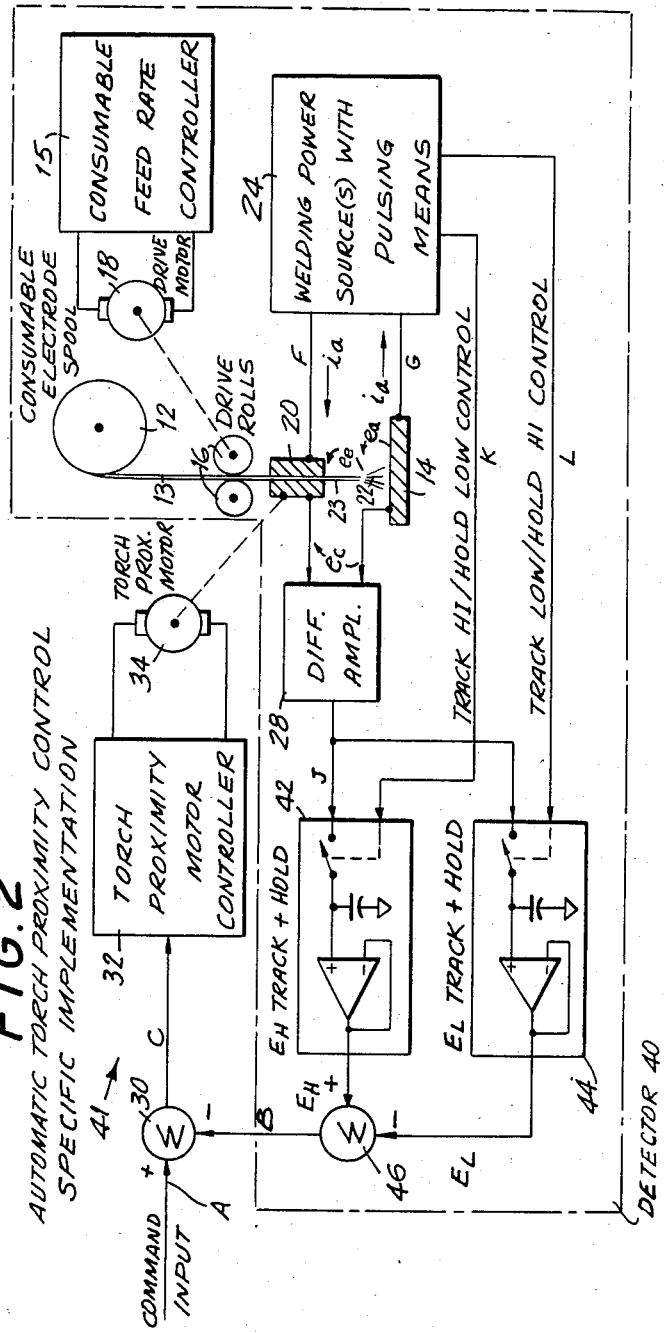
FIG. 2 is a block diagram for a specific implementation of an automatic torch proximity control using voltage detection means and the existing characteristics of commercially available pulsed power sources.

Depending on the method of implementation, some of the elements or blocks comprising the detector 10 may not be required. If the power varying means produces a well defined current or voltage variation for specific sets of weld parameters, the impedance computation means 26, and either the current sensor 21 or the voltage sensor 25, respectively might not be needed. For example, the system of FIG. 2 illustrates a system which only requires voltage sensing means. In these situations, the voltage or current sensor elements could also contain the elements required to process the sensed signals into distance related information which would then be sent directly to the negative input of summing element 30.

If needed by the impedance computing means, the voltage sensor, or the current sensor, an optional synchronizing signal could be developed within the power varying means, or derived directly from the voltage or current signals within the voltage or the current sensor. FIG. 2 illustrates the case where the synchronizing track and hold signals needed for sensed voltage processing are developed with the power source.

Referring again to FIG. 1, a detection technique for the case where the method of varying the power supplied to the arc by superimposing a small sine wave of current on the average welding current is described hereinbelow. In this case, current sensor 21 may contain a narrow passband filter tuned to the frequency of the sine wave and a peak-to-peak amplitude detector which produces an output E representative of the peak-to-peak current of the sine wave component.

Voltage sensor 25 senses the voltage between the contact tip and the workpiece. The voltage sensor 25 may also use a passband filter and peak-to-peak amplitude detector to produce an output D representative of the peak-to-peak amplitude of the sine wave component of voltage $e_c$. The impedance computing means then produces an output B by calculating the ratio of D to E, which is therefore representative of the impedance between the contact tip and the workpiece. The approach is not limited to the use of peak-to-peak detectors, because other types of detectors such as absolute value, rms, etc., could be used to obtain the needed voltage and current information.

Assuming the impedance between the contact tip and electrode material is relatively small, the total impedance between the contact tip and the work piece contains two major components: the stick-out impedance and dynamic impedance of the arc at the frequency of the sine wave. The stick-out impedance is highly dependent on stick-out length, and, particularly at higher measurement frequencies, the arc impedance is relatively independent of arc length. Even so, output B provides a good indication of stick-out length and indirectly provides an indication of torch to work piece distance. For a given set of welding parameters, the torch proximity can be controlled by methods which cause output B to correspond with a desired or commanded value.

The torch proximity/weldment geometry detector 10 provides the key element needed in controlling the relative positions of the torch and workpiece. The detector can be directly used with a controller to control the torch to workpiece proximity by moving either the workpiece or the torch in the manner described hereinbelow. Also, by combining the detector with mechanisms which cause oscillating or weaving movement of the torch and/or workpiece across the weld joint and then combining output of the detector with the weave pattern information, information can be obtained relating to the workpiece geometry and/or the relative position and location of the torch and the work piece. In this manner, the edge or edges of a prepared weld joint can be detected for use in automatic edge or seam tracking.

Referring again to FIG. 1, a detailed description of the torch proximity control system 11 is illustrated. In addition to all of the elements of the detector 10, this system 11 also contains a command or reference input A, summing means 30, torch proximity motor controller means 32, and a torch proximity motor and mechanism 34 for adjusting the weld torch to base metal distance.

When configured as an impedance controller, these elements work together to indirectly control the proximity of the torch to workpiece. Summing means 30 compares the commanded impedance A with the actual distance related impedance B at the output of impedance computing means 26 (output of the detector) and generates a signal C which is a function of the difference between signals A and B. The torch proximity motor controller 32 uses this differential signal C to adjust the distance between the torch and base metal. When the measured impedance is greater than the commanded impedance, the distance is reduced and when the measured impedance is less than the commanded impedance, the distance is increased with the result that the measured impedance is brought into correspondence with the commanded value. Holding the impedance constant indirectly holds the torch to workpiece distance constant at the desired or commanded value.

The torch proximity controller can be implemented in various ways such as, "bang bang" or proportional control. Averaging or other processing means can be incorporated within the controller to make the system less sensitive to noise and to allow optimization of the system response to variations in proximity.

Referring to FIG. 2, there is illustrated a block diagram for a specific implementation of an automatic torch proximity control using voltage detection means and the existing characteristics of commercially available pulsed power sources.

The proximity detector 40 contains an apparatus for feeding a consumable electrode material 13 through a welding torch which has a contact tip or element 20 and on to the base metal, weldment, workpiece, or part to be welded 14, where the arc 22 is established. The contact element 20 provides the means for transferring electrical power from the pulsed welding power source 24 to the electrode material and ultimately to the welding arc. Leads F and G connect the welding power source to the contact tip and weldment, respectively.

The apparatus for feeding the consumable electrode material comprises a feed rate controller 15, a feed drive motor 18, "pinch" drive rolls 16, and a spool of consumable electrode material 12. The feed rate controller is used to control or regulate the rate at which the consumable electrode is fed into the arc. All of the elements described up to this point are common to any apparatus for pulsed arc welding with consumable electrode material.

Figure 3:
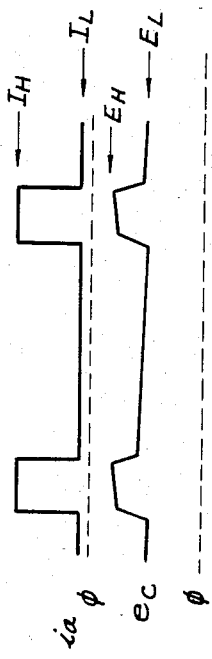
FIG. 3 is a sketch of the arc current and arc voltage waveforms produced by the system shown in FIG. 2, wherein the current pulse waveshape has been idealized.

The additional elements specifically required for detector 40 are differential amplifier 28, $E_h$ track and hold 42, $E_l$ track and hold 44, and summing means 46. Detector 40 functions in the following manner. The pulsed power source produces current pulses shown as $i_a$ in FIG. 3, resulting in corresponding voltage waveform $e_c$. Differential amplifier 28 is used to sense voltage $e_c$ and remove any common mode errors. The output J of amplifier 28 is connected to the inputs of track and hold elements 42 and 44. Synchronizing signals K and L, developed within the power source, are used by the track and hold elements 42,44 to obtain voltages $E_h$ and $E_l$ as defined in FIG. 3. Summing means 46 develops an output B which is a function of the difference $E_h$ minus $E_l$. This difference is related to the impedance between the contact tip and the work piece, and the impedance is related to the torch to work piece distance as previously discussed.

In addition to the elements of detector 40, automatic proximity control system 41 also contains a command or reference input A, summing means 30, torch proximity motor controller means 32, and a torch proximity motor and mechanism 34 for adjusting the weld head to base metal distance.

When configured as a peak-to-peak voltage controller, these elements work together to indirectly control the proximity of the torch to work piece. Summing means 30 compares the commanded p-p voltage A with the actual distance related p-p voltage B at the output of detector 40 and generates a signal C which is a function of the difference between signals A and B. The torch proximity motor controller 32 uses the differential signal C to adjust the distance between the torch and base metal. When the measured voltage is greater than the commanded voltage, the distance is reduced and when the measured voltage is less than the commanded voltage, the distance is increased with the result that the measured voltage is brought into correspondence with the commanded value. Holding the peak-peak voltage constant indirectly holds the torch to work piece distance constant at the desired value.

If synchronizing signals K and L are not readily available within the power source, they can be developed directly from current or voltage measurements. The pulsed power source could include multiple power sources such as those described in U.S. Pat. No. 4,409,465 to Yamamoto et al. or U.S. Pat. No. 4,438,317 to Ueguri et al. or a single power source such as that described in U.S. Pat. No. 4,301,355 to Kimbrough et al. These patents are expressly incorporated herein by reference.

At first glance, it might seem that the methods of FIG. 1 and FIG. 2 might seriously interact with other controllers currently used to regulate arc voltage or current. However, these controllers generally regulate either average, pulse, or background voltage, whereas the systems of FIG. 1 and FIG. 2 may be configured to control peak-to-peak voltage or current, thereby minimizing such interaction. In fact, experience has shown that a pulsed power source which regulates arc voltage combined with the system of FIG. 2 work hand-in-hand to control both proximity and the average welding voltage.

It is conceivable that a proximity controller could be used in a pulsed power system to regulate the voltage (or current) during either the pulse interval or low current interval in combination with power source regulating means which regulate the voltage (or current)

during either the low current interval or the pulse interval, respectively. The combination of the two regulators would then achieve regulation of the peak-to-peak voltage, thereby regulating torch proximity.

The methods disclosed are based on through-the-arc sensing. Through-the-arc sensing offers the advantages of being non-contacting (not influenced by irregularities in the surface of contact) and sensing directly at the arc location. With the possible exception of optical sensing, the other techniques require the sensing mechanism to be offset from the location of the arc and the molten puddle. This offset can cause problems when welding irregular shapes and contours. Optical sensing and processing can be used, but this type of sensing tends to be much more complicated and expensive than through-the-arc sensing.

Present current sensing techniques suffer from a very poor signal to noise ratio and require substantial processing and filtering. The latter severely limits the response time of the control process, which in some applications limits the technique to abnormally and unacceptably slow welding rates. The system of FIG. 2 has been found to have an excellent signal to noise ratio and works well at higher welding rates.

While analog control methods are shown, digital controllers can just as easily be used with the reference input(s) instead being numeric in value.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

I claim:

1. A welding torch means position detection system comprising:
   means for directing consumable electrode metal through contact means in a welding torch means to a workpiece;
   means for providing electrical power to establish an arc between the consumable electrode metal and workpiece;
   means for varying the electrical power supplied to the arc; and
   means for detecting impedance related information due to the effect of the electrical power variation on at least one of arc voltage or arc current to obtain contact means to workpiece distance related information.

2. The detection system according to claim 1 wherein the means for varying the electrical power comprises means for varying at least one of current or voltage.

3. The detection system according to claim 2 wherein the means for detecting impedance related information is at least one of arc voltage sensing means or arc current sensing means.

4. The detection system according to claim 3 wherein the arc voltage sensing means or arc current sensing means comprises means to process the sensed voltage or current signals to utilize impedance related information to control the contact means to workpiece distance.

5. The detection system according to claim 4 wherein the arc voltage sensing means or arc current sensing means includes electronic filter means to selectively sense the impedance related information.

6. The detection system according to claim 1 further comprising means for processing the detected impedance related information so as to control the contact means to workpiece distance.

7. The system according to claim 6 wherein the means for detecting the effect of electrical power variation comprises voltage sensing means and current sensing means.

8. The detection system according to claim 7 wherein the means for processing the detected effect on arc voltage and arc current is impedance computing means.

9. The detection system according to claim 8 further comprising electronic filter means to selectively sense the desired information.

10. The detection system of claim 1 wherein the means for varying the electrical power supplied to the arc comprises one of means for electrically modifying the output of the electrical power providing means; means for perturbing the feed rate of the consumable electrode metal or means for perturbing the contact means to workpiece distance.

11. A welding torch means position detection system comprising:
    means for directing consumable electrode metal through contact means in a welding torch means to a workpiece;
    means for providing electrical power to establish an arc between the consumable electrode metal and the workpiece, the electrical power providing means including means for producing a predetermined current variation;
    means for detecting the effect of the predetermined current variation on the arc voltage; and
    means for processing the detected effect on the arc voltage so as to obtain impedance related information which is representative of the contact means to workpiece distance 12. The detection system according to claim 11 wherein the means for providing electrical power comprises pulsed power source means.

13. The detection system according to claim 12 wherein the detecting means further comprising means for detecting the effect of the predetermined current variation on the arc current.

14. A welding torch means position detection system comprising:
    means for directing consumable electrode metal through contact means in a welding torch means to a workpiece;
    means for providing electrical power to establish an arc between the consumable electrode metal and the workpiece, the electrical power providing means including means for producing a predetermined voltage variation;
    means for detecting the effect of the predetermined voltage variation on the arc current; and
    means for processing the detected effect on the arc current so as to obtain impedance related information which is representative of the contact means to workpiece distance related information.

15. The detection system according to claim 14 wherein the detecting means further comprises means for detecting the effect of the predetermined voltage variation on the arc voltage.

16. A welding system comprising:
    a supply of consumable electrode metal;
    means for directing said consumable electrode metal from said supply through contact means in a welding torch means to a workpiece;

means for providing electrical power to establish an arc between the consumable electrode metal and workpiece;

means for varying the electrical power supplied to the arc;

means for detecting impedance related information due to the effect of the electrical power variation on at least one of arc voltage or arc current;

means for processing the detected impedance related information so as to produce contact means to workpiece distance related information; and means operatively associated with the processing means for controlling the relative distance between the contact means and workpiece.

17. The welding system according to claim 16 wherein the means for controlling the relative distance between the welding torch means and workpiece comprises:

means for adjusting the position of at least one of the contact means or workpiece;

means for commanding a desired positional relationship of the contact means and workpiece;

means for comparing the detected distance related information with the desired positional relationship; and means operatively associated with the comparison means for controlling the position adjusting means to correspond the detected distance with the desired positional relationship.

18. The welding system according to claim 17 wherein said adjusting means comprises means for automatically varying the vertical and/or horizontal position of the welding torch means with respect to the workpiece.

19. The welding system according to claim 17 further comprising means for detecting and controlling the position of the torch means across and along a welding seam.

20. The welding system according to claim 17 further comprising means operatively associated with the means for providing electrical power for perturbing at least one of the contact means or workpiece such that the contact means weaves across a prepared weld joint on the workpiece in order to enhance detection and control of the horizontal and/or vertical position of the welding torch contact means with respect to the workpiece.

21. The welding system according to claim 16 further comprising means for perturbing at least one of the welding torch means or workpiece such that the welding torch means traverse back and forth or weaves across the workpiece in a cross seam direction.

22. A welding system comprising:

a supply of consumable electrode metal;

means for directing said consumable electrode metal from said supply through contact means in a welding torch means to a workpiece; means for providing electrical power to establish an arc between the consumable electrode metal and workpiece, the electrical power providing means including means for producing a predetermined current variation;

means for detecting the effect of the predetermined current variation on at least one of arc voltage or arc current;

means for processing the detected effect on the arc voltage or arc current so as to produce impedance related information representative of the contact means to workpiece distance;

means for adjusting the position of at least one of the contact means or workpiece;

means for commanding a desired positional relationship of the contact means and workpiece;

means for comparing the detected impedance related information with the desired positional relationship; and means operatively associated with the comparison means for controlling the position adjusting means to correspond the detected impedance related information with the desired positional relationship.

23. A welding system comprising:

a supply of consumable electrode metal;

means for directing said consumable electrode metal from said supply through contact means in a welding torch means to a workpiece;

means for providing electrical power to establish an arc between the consumable electrode metal and workpiece, the electrical power providing means including means for producing a predetermined voltage variation;

means for detecting the effect of the predetermined voltage variation on at least one of arc voltage or arc current;

means for processing the detected effect on the arc voltage or arc current so as to produce impedance related information representative of the contact means to workpiece distance;

means for adjusting the position of at least one of the contact means or workpiece;

means for commanding a desired positional relationship of the contact means and workpiece;

means for comparing the detected impedance related information with the desired positional relationship; and means operatively associated with the comparison means for controlling the position adjusting means to correspond the detected impedance related information with the desired positional relationship.

24. A method for detecting the distance between welding torch contact means and a workpiece which comprises:

directing consumable electrode metal through welding torch contact means to a workpiece;

providing electrical power to establish an arc between the consumable electrode metal and the workpiece;

varying the electrical power supplied to the arc;

detecting the effect of the electrical power variation on at least one of arc voltage or arc current; and processing the detected effect to obtain impedance related information representative of the contact means to workpiece distance.

25. The detection method according to claim 24 wherein the step of varying the electrical power comprises varying at least one of current or voltage, perturbing the feed rate of the consumable electrode metal or perturbing the contact means to workpiece distance.

26. The detection method according to claim 24 wherein the detecting step comprises sensing the arc voltage and/or arc current and processing the sensed signals to obtain said impedance related information.

27. A method for detecting the distance between welding torch contact means and a workpiece which comprises:

directing consumable electrode metal through welding torch contact means to a workpiece;
providing electrical power to establish an arc between the consumable electrode metal and the workpiece;
producing a predetermined current variation of said electrical power;
detecting the effect of the predetermined current variation on the arc voltage; and
processing the detected effect on the arc voltage so as to obtain impedance related information representative of the welding torch contact means to workpiece distance.

28. The detection method according to claim 27 wherein the detecting step further comprises detecting the effect of the predetermined current variation on the arc current.

29. A method for detecting the distance between welding torch contact means and a workpiece which comprises:
directing consumable electrode metal through welding torch contact means to a workpiece;
providing electrical power to establish an arc between the consumable electrode metal and the workpiece;
producing a predetermined voltage variation of said electrical power;
detecting the effect of the predetermined voltage variation on the arc current; and
processing the detected effect on the arc current so as to obtain impedance related information representative of the welding torch contact means to workpiece distance.

30. The detection method according to claim 27 wherein the detecting step further comprises detecting the effect of the predetermined voltage variation on the arc voltage.

31. A welding method comprising:
directing consumable electrode metal through contact means in a welding torch means to a workpiece;
providing electrical power to establish an arc between the consumable electrode metal and workpiece;
producing detectable impedance related information between said contact means and workpiece by varying the electrical power supplied to the arc, perturbing the feed rate of the consumable electrode metal or perturbing the contact means to workpiece distance;
detecting the impedance related information by measuring the variation of at least one of arc voltage or arc current;
processing the detected impedance related information so as to produce welding torch contact means to workpiece distance related information; and
controlling the welding torch contact means workpiece distance to a predetermined value.

32. The welding method according to claim 31 wherein said step of controlling the welding torch contact means to workpiece distance comprises:
adjusting the position of at least one of the contact means or workpiece;
commanding a desired positional relationship of the contact means and workpiece;
comparing the detected distance related information with the desired positional relationship; and
controlling the adjusted position to correspond the detected distance with the desired positional relationship.

33. The method according to claim 30 wherein said position adjusting step comprises automatically varying the vertical and/or horizontal position of the contact means and torch means with respect to the workpiece.

34. The welding method according to claim 33 which further comprises:
perturbing at least one of the welding torch means or workpiece such that the welding torch means weaves across a prepared weld joint on the workpiece in order to enhance detection and control of the horizontal and/or vertical position of the welding torch means with respect to the workpiece.

35. The welding method according to claim 31 which further comprises perturbing at least one of the welding torch means or workpiece such that the welding torch means traverses back and forth or weaves across the workpiece.

36. The welding method according to claim 31 which further comprises detecting and controlling the position of the torch means across and along a welding seam.

37. A welding method comprising:
directing consumable electrode metal through contact means in a welding torch means to a workpiece;
providing variable electrical power to establish an arc between the consumable electrode metal and the workpiece;
detecting the effect of the variable electrical power on at least one of arc voltage or arc current;
processing the detected effect on the arc voltage or arc current so as to produce impedance related information representative of the contact means to workpiece distance;
adjusting the position of at least one of the contact means or workpiece;
commanding a desired positional relationship of the contact means and workpiece;
comparing the detected impedance related information with the desired positional relationship; and
controlling the adjusted position to correspond the detected impedance related information with the desired positional relationship.

38. A welding method comprising:
directing consumable electrode metal through contact means in a welding torch means to a workpiece;
providing electrical power to establish an arc between the consumable electrode metal and the workpiece;
producing a predetermined current variation in said electrical power;
detecting the effect of the predetermined current variation on at least one of arc voltage or arc current;
processing the detected effect on the arc voltage or arc current so as to produce impedance related information representative of the contact means to workpiece distance;
adjusting the position of at least one of the contact means or workpiece;
commanding a desired positional relationship of the contact means and workpiece;
comparing the detected impedance related information with the desired positional relationship; and controlling the adjusted position to correspond the detected impedance related information with the desired positional relationship.

39. A welding method comprising:

directing consumable electrode metal through contact means in a welding torch means to a workpiece;

providing electrical power to establish an arc between the consumable electrode metal and the workpiece;

producing a predetermined voltage variation in said electrical power;

detecting the effect of the predetermined voltage variation on at least one of arc current or arc voltage;

processing the detected effect on the arc current or arc voltage so as to produce impedance related information representative of the contact means to workpiece distance;

adjusting the position of at least one of the contact means or workpiece;

commanding a desired positional relationship of the contact means and workpiece;

comparing the detected impedance related information with the desired positional relationship; and controlling the adjusted position to correspond the detected impedance related information with the desired positional relationship.

* * * * *